United States Patent

[11] 3,601,198

| [72] | Inventors | George P. Ahearn;<br>Othar M. Kiel, both of Houston, Tex. |
|---|---|---|
| [21] | Appl. No. | 794,061 |
| [22] | Filed | Jan. 27, 1969 |
| [45] | Patented | Aug. 24, 1971 |
| [73] | Assignee | Esso Production Research Company |

[54] HYDRAULIC FRACTURING OPERATIONS
10 Claims, 1 Drawing Fig.

[52] U.S. Cl. ..................................................... 166/308,
252/8.55 R
[51] Int. Cl. ............................................................. E21b 43/26
[50] Field of Search ........................................... 166/283,
308; 252/8.55 A, 33, 42.7, 46.6

[56] References Cited
UNITED STATES PATENTS

| 2,595,819 | 5/1952 | Smyers et al. .................. | 252/46.6 |
| 3,065,172 | 11/1962 | Groves et al. .................. | 252/8.55 A |
| 3,105,047 | 9/1963 | Miller et al. .................... | 252/8.55 A |
| 3,130,160 | 4/1964 | Morway et al. ................. | 252/8.55 A |
| 3,167,124 | 1/1965 | Graham .......................... | 166/283 |
| 3,351,079 | 11/1967 | Gibson ............................ | 166/283 X |
| 3,378,074 | 4/1968 | Kiel ................................. | 166/308 |

OTHER REFERENCES

Amyx, James W., et al. Petroleum Reservoir Engineering N.Y., McGraw-Hill, 1960. pp. 1–9. (Copy in Group 350)

*Primary Examiner*—Ian A. Calvert
*Attorneys*—James A. Reilly, John B. Davidson, Lewis H. Eatherton, James E. Gilchrist and James E. Reed

ABSTRACT: A hydraulic fracturing operation wherein a viscous residual petroleum fraction or similar hydrocarbon oil containing an oil-soluble anionic surface-active agent in a concentration sufficient to increase the viscosity index of the oil is used as a fracturing fluid.

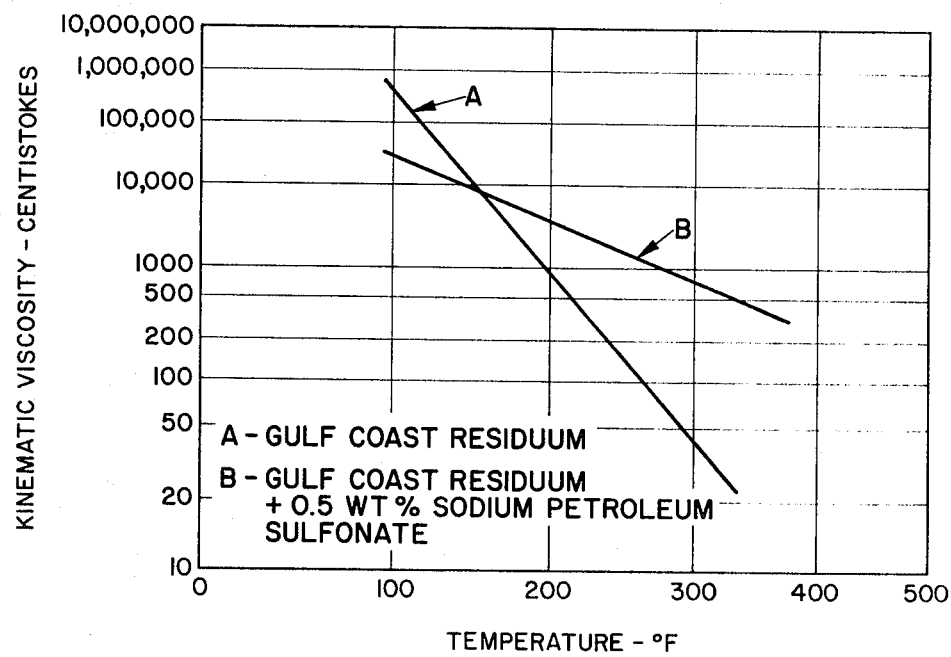

3,601,198

HYDRAULIC FRACTURING OPERATIONS

BACKGROUND OF THE INVENTION

1. Field of the Invention

This invention relates to hydraulic fracturing and similar operations in which viscous hydrocarbon oils are injected into wells penetrating subterranean formations.

2. Description of the Prior Art

Hydraulic fracturing has been widely used for stimulating the production of crude oil and natural gas from subterranean reservoirs. Conventional fracturing methods generally require the injection of a fracturing fluid containing a suspended propping agent into a well at a rare sufficient to open a fracture in the exposed formation. The propping agent particles carried by this fluid prevent complete closure of the fracture as fluid leaks off into the adjacent formation and thus result in permeable channels through which other fluids can subsequently be injected or produced. The conductivities of these channels depend upon the fracture dimensions, the size of the propping agent particles, the spacing of the particles, and the formation confining pressures. Methods for predicting the fracture dimensions and conductivities that will be obtained during fracturing operations have been described in the literature and will be familiar to those skilled in the art.

A variety of different fluids have been used in hydraulic fracturing operations. Experience has shown that viscous residual petroleum fractions and similar heavy hydrocarbon oils are especially effective, particularly when used in conjunction with less viscous fluids that serve to lubricate the heavy oils down the tubing or casing. These oils have relatively low filter loss values, produce greater hydraulic friction within the fracture than is normally obtained with less viscous liquids or conventional gelled fluids, and are capable of suspending large, high-density, propping agent particles without excessive settling. Viscous oils with these properties often permit the generation of fractures with considerably higher conductivities than can be obtained with other fluids.

One disadvantage associated with the heavy oils is that they often have relatively low viscosity index values. They loss viscosity rapidly with increasing temperature. To secure the desired viscosities at formation temperatures, it may therefore be necessary to employ oils that are too viscous to be conveniently handled under atmospheric temperature conditions. These handling difficulties can usually be overcome by heating the oil and transporting it to the well site in an insulated tank but this increases the cost of the fracturing operation and poses certain practical difficulties.

It has been shown that problems due to the low viscosity index values of certain crude oils and distillate fractions can be mitigated by the addition of viscosity index improvers. These materials are normally aromatic hydrocarbon solutions of high molecular weight methacrylic or polyisobutylene polymers. Experience has shown that such materials often have little or no effect on the viscosity index values of viscous residual petroleum fractions and similar heavy hydrocarbon oils.

SUMMARY OF THE INVENTION

This invention provides an improved method for coping with the problems outlined above. In accordance with the invention, it has now been found that the viscosity index values of viscous petroleum residual fractions and similar high viscosity hydrocarbon oils can be increased significantly by the addition of small amounts of an oil-soluble anionic surface-active agent to the oils. Experimental work has shown that the use of these materials in low concentrations will often substantially decrease the change in viscosity that takes place as the temperature of the heavy oil increases. This facilitates the use of such oils in hydraulic fracturing and other operations requiring the use of fluids with high viscosities at formation temperatures and will often permit handling of the oils at much lower surface temperatures than might otherwise be feasible.

The mechanisms responsible for the improved results obtained in accordance with the invention are not fully understood. Studies indicate, however, that the high viscosities of high boiling petroleum residuums and similar heavy hydrocarbon oils are due in part to the presence of high molecular weight asphaltenes and resinous constituents. These materials are dispersed by the oil-soluble anionic surface-active agents or detergents so that the viscosity of the oil becomes less sensitive to changes in temperature. At relatively low temperatures, the presence of the surface-active agent or detergent tends to depress the viscosity of the oil somewhat. At higher temperatures, the detergent tends to increase the oil viscosity. The overall effect is that the oil undergoes a much smaller change in viscosity as it is heated from normal atmospheric temperatures of from about 50° F. to 100° F. to formation temperatures in the range between about 150° F. and 350° F. This has substantial advantages in hydraulic fracturing and similar operations. Other mechanisms may also be involved.

BRIEF DESCRIPTION OF THE DRAWING

The drawing in the application is a plot of kinematic viscosity versus temperature showing the effect of a typical oil-soluble anionic surface-active agent on the viscosity of a heavy oil suitable for use in hydraulic fracturing operations.

DESCRIPTION OF THE PREFERRED EMBODIMENTS

The heavy oils with which the invention is primarily concerned are high boiling crude oils and petroleum fractions containing asphaltenes and resinous constituents in significant quantities. Such oils will normally have viscosities in excess of about 100 centipoises at 70° F. In some cases, the viscosities may be several million centipoises at such temperatures. Typical of these oils are high viscosity asphaltic crude oils, vacuum still residual petroleum fractions, heavy lube oil stocks, low pour point residual oils, number 6 fuel oils, heavy catalytic cracking feedstocks, lube oil extracts, flashed cracked residuums, straight run asphalts, cutback asphalts, low temperature Gilsonites, and blended oils containing residual constituents in substantial quantities. Oils having viscosities at 70° F. in the range between about 200 centipoises and about 10,000 poises are particularly useful in hydraulic fracturing and similar operations requiring the injection of a heavy oil into a subterranean formation and are generally preferred for purposes of the invention.

A variety of different oil-soluble anionic surface-active agents or detergents can be utilized in carrying out the invention. These include petroleum sulfonates, synthetic alkyl aryl sulfonates, alkyl phenates, alkyl phenate sulfides, phosphosulfurized olefin polymers, and various combinations of these and other materials. All of these materials are not equally effective for purposes of the invention. The sulfonates and related materials have been found particularly effective in most applications and are therefore generally preferred.

The petroleum sulfonates suitable for purposes of the invention are generally oil-soluble alkaline earth metal salts of high molecular weight sulfonic acids produced by the treatment of hydrocarbon oils in the lubricating oil boiling range with fuming sulfuric acid, oleum, or $SO_3$. Such sulfonates normally have molecular weights in the range between about 300 and about 750 but on occasion higher molecular weight materials may also be present. Typical sulfonates are often marketed as solutions in mineral oil or a mixture of oil, water, and alcohol for use as cutting oils, dry cleaning agents, emulsion bases, and the like. Processes for the manufacture of the petroleum sulfonates have been described at length in the literature and will be familiar to those skilled in the art.

Synthetic alkyl aryl sulfonates that may be utilized for purposes of the invention can be prepared from relatively pure alkyl aryl sulfonic acids containing from about 10 to about 33 carbon atoms per molecule. These synthetic sulfonates are generally prepared by the sulfonation of alkylated aromatics such as benzene, toluene, xylene and naphthalene alkylated with olefins or olefin polymers such as polypropylene, polyisobutylene, or the like. Specific examples of suitable sulfonates include calcium petroleum sulfonate, barium petroleum sulfonate, calcium di-$C_8$ alkyl benzene sulfonate, barium di-$C_9$ alkyl benzene sulfonate and calcium $C_{16}$ alkyl benzene sulfonate. The di-$C_8$ alkyl groups in such materials can be derived from diisobutylene. The $C_9$ alkyl groups can be obtained from tripropylene. Tetraisobutylene may be employed as a source for the $C_{16}$ alkyl groups in these materials. The sodium salts of the petroleum sulfonates are generally preferred. The sulfonates may be either neutral sulfonates in which the sulfonic acid is neutralized with an equivalent amount of metal base or high alkalinity sulfonates in which an amount of the metal base in excess of that required for simple neutralization of the sulfonic acid is reacted with the acid and carbon dioxide is then used to reduce the alkalinity.

The alkyl phenates that may be employed for purposes of the invention may contain straight or branched chain alkyl groups of from about 5 to about 20 carbon atoms in length. Such compounds can be prepared by reacting an alkyl phenol such as octyl phenol, nonyl phenol, or dodecyl phenol with a metallic hydroxide such as sodium hydroxide, calcium hydroxide, chromium hydroxide or the like. The alkali and alkaline earth metal hydroxide are preferred. Detergents of this type have been used in crankcase-lubricating oils and similar compositions and have been described at length in the technical literature.

The alkyl phenate sulfides suitable for purposes of the invention are generally metal salts of phenol sulfides having the following formula:

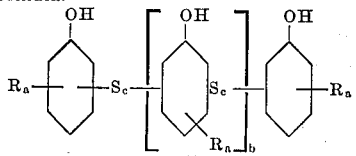

Where R represents an alkyl group, $a$ is 0 to 4, $b$ is 0 to 10, and $c$ is 1 to 5.

Each alkyl group in the phenol sulfides may contain from about 5 to about 20 carbon atoms, arranged in either a straight or branched chain. The use of phenol sulfides containing $C_7$ to $C_{12}$ alkyl substituents is generally preferred. The phenate sulfides are prepared by reacting the phenol sulfides with metallic hydroxides such as aluminum hydroxide, cobalt hydroxide, chromium hydroxide, sodium hydroxide, calcium hydroxide, barium hydroxide, magnesium hydroxide or the like. The alkali metal and alkaline earth metal hydroxides are normally preferred. An equivalent amount of the hydroxide may be used or instead an excess of the metal base may be employed to obtain high alkalinity phenate sulfides which can be subsequently neutralized by blowing with carbon dioxide or by other means. Specific examples of suitable phenate sulfides include barium tertiary octyl phenol sulfide, calcium tertiary octyl phenol sulfide, barium-calcium tertiary octyl phenol sulfide, barium tertiary amyl phenol sulfide, calcium tertiary amyl phenol sulfide, barium nonyl phenol sulfide and the like.

Phosphosulfurized olefin detergents that may be employed for controlling the viscosity index values of the heavy oils can be prepared by reacting an olefin or an olefin polymer with phosphorous pentasulfide. Such materials are typically manufactured by the treatment of polyisobutylene having a molecular weight in the range of from about 700 to about 1,500 with phosphorous pentasulfide. These phosphosulfurized olefin detergents have been widely used and are well known in the art.

The concentrations in which the oil-soluble anionic surface-active agents are used in the heavy oils will depend in part upon the properties of the particular surface-active agent and oil selected and on the change in the viscosity index needed. In general, however, the detergent will normally be employed in concentrations between about 0.05 percent and about 5 percent by weight. Concentrations between about 0.1 percent and about 2 percent are usually adequate and are therefore generally preferred.

In utilizing the oil-soluble detergents for hydraulic fracturing operations, it is generally preferred to add the detergent to the heavy oil at the well site. As pointed out earlier, the high viscosity residual petroleum fractions and similar hydrocarbon oils with which the invention is primarily concerned are used most effectively by lubricating them down the tubing or casing of the well with water, brine, or a similar fluid substantially immiscible with the heavy oil. The viscous oil containing the oil-soluble detergent and the substantially less viscous fluid employed to lubricate the heavy oil through the tubing or casing may be separately introduced near the upper end of the tubing or casing string by means of a tangential, T or Y fitting or may be mixed in advance to form a loose emulsion or dispersion from which sufficient excess low viscosity liquid migrates to the inner wall of the pipe to maintain a low viscosity film between the viscous oil and the pipe wall. Normally, however, it is advantageous to employ an annular injector through which a central stream of the viscous oil containing the detergent and a concentric, annular stream of the less viscous liquid are introduced into the well. The two streams contact one another at the lower end of the injector after a well-defined flow pattern has been established. The pattern thus obtained persists with relatively little mixing as the fluids flow down the well. This simplifies handling of the two fluids and will normally permit operation over a broad range of injection conditions.

If the heavy oil is to be used with a less viscous, substantially immiscible liquid in the manner described above, care should be taken to insure that the detergent selected does not promote the formation of stable emulsions between the heavy oil and less viscous liquid. This can generally be done by controlling the concentrations in which the anionic detergent is used. Nonionic surface-active agents which function as demulsifiers but have little or no effect upon the viscosity index of the heavy oil can also be added to the oil, to the less viscous liquid, or to both fluids to inhibit the formation of stable emulsions and promote the continued existence of the film of the low viscosity liquid. A more detailed description of the use of a highly viscous oil and a substantially less viscous liquid which is essentially immiscible with the oil in hydraulic fracturing operations is set forth in U.S. Pat. No. 3,378,074, issued to Othar M. Kiel on Apr. 16, 1968.

Before adding the oil-soluble detergent to the heavy oil in the field, it will normally be advisable to prepare a viscosity-temperature chart similar to that shown in the drawing for the particular oil and detergent to be used. Curve A in the drawing shows the viscosity-temperature behavior for a Gulf Coast residuum which has a viscosity of about 500,000 centistohes at a temperature of 100° F. and a viscosity of only about 45 centistohes at a temperature of 300°F. In a deep well with a formation temperature in excess of 300° F., such an oil might be required to secure the fracture width needed for effective stimulation. Curve B on the graph shows that the addition of 0.5 percent by weight of a sodium petroleum sulfonate having an average molecular weight of 460 to the Gulf Coast residuum produced a marked change in the viscosity index of the heavy oil. At a temperature of 100° F., the oil containing the detergent had a viscosity of about 25,000 centistohes. The viscosity was about 700 centistohes at 300° F. The addition of the sulfonate thus depressed the viscosity of the heavy oil at temperatures below about 150° F. and increased the viscosity significantly at temperatures higher than 150° F. This behavior is typical of the sulfonates and similar oil-soluble anionic surface-active agents in this system.

The data from the drawing show that the treated oil containing the sulfonate would have a viscosity of about 400 centistohes at a formation temperature of 350° F. If heated to a temperature of about 210° F. at the earth's surface, the oil would have a viscosity of about 3,000 centistohes. Heated oils of this viscosity can be lubricated down the tubing or casing of a well with a heavy brine during hydraulic fracturing operations to permit the fracturing of highly permeable formations that are difficult or impossible to fracture with less viscous fluids. Because of problems that may arise due to the generation of steam, heating of the oil to higher temperatures should normally be avoided. In the absence of the sulfonate, the required viscosity and formation temperature could not be obtained.

After the petroleum sulfonate or other oil-soluble anionic detergent has been added to the heavy oil, the fracturing operation can be carried out in the normal manner. On return of the well to production, the heavy oil injected during the operation will be rapidly diluted by crude oil from the formation. Experience has shown that the diluted oil can normally be produced without difficulty. Wells treated with the very heavy oils normally clean up in a relatively short time.

The process of the invention is not restricted to hydraulic fracturing operations in which a heavy oil is lubricated down the tubing or casing with a fluid of lower viscosity. The oil-soluble anionic detergents can be employed to alter the viscosity index values of heavy oils utilized in a variety of different oilfield operations.

We claim:

1. A well-treating process wherein a treating agent consisting essentially of an oil-soluble anionic detergent is added to a viscous hydrocarbon oil containing asphaltenes and resins in substantial quantities in a concentration sufficient to increase the viscosity index of said oil and the said oil is thereafter injected into a subterranean formation surrounding a well bore.

2. A process as defined by claim 1 wherein said detergent is a petroleum sulfonate having a molecular weight in the range between about 300 and about 750.

3. A process as defined by claim 1 wherein said detergent is present in said oil in a concentration between about 0.05 percent and about 5 percent by weight.

4. A process as defined by claim 1 wherein said detergent is a synthetic alkylaryl sulfonate prepared from an alkylaryl sulfonic acid containing from about 10 to about 33 carbon atoms per molecule.

5. A process as defined by claim 1 wherein said hydrocarbon oil is a residual petroleum fraction.

6. A process as defined by claim 1 wherein said detergent is an alkyl phenate containing $C_5$ to $C_{20}$ alkyl groups.

7. A process as defined by claim 1 wherein said detergent is an alkyl phenate sulfide containing $C_5$ to $C_{20}$ alkyl substituents.

8. A process as defined by claim 1 wherein said detergent is a phosphosulfurized polyolefin prepared from a polyisobutylene having a molecular weight in the range between about 700 and about 1500.

9. A process as defined by claim 1 wherein said oil injected into said formation has a viscosity at 70° F. in the range between about 200 centipoises and about 10,000 poises.

10. In a hydraulic fracturing process wherein a hydrocarbon oil having a viscosity in excess of about 100 centipoises at 70° F. and containing asphaltenes and resins in substantial quantities is injected into a well and contacted with a subterranean formation, the improvement which comprises incorporating into said oil a treating agent consisting essentially of an oil-soluble anionic detergent in a concentration sufficient to produce a substantial increase in the viscosity index of said oil.